United States Patent
Clark

(10) Patent No.: US 7,505,045 B2
(45) Date of Patent: Mar. 17, 2009

(54) SYSTEM AND METHOD FOR DECODING LIVE AUDIO/VIDEO INFORMATION

(75) Inventor: Adam Leslie Clark, Melbourne (AU)

(73) Assignee: Adams Platform Pty Ltd., Black Rock (AU)

( * ) Notice: Subject to any disclaimer, the term of this patent is extended or adjusted under 35 U.S.C. 154(b) by 617 days.

(21) Appl. No.: 10/771,097

(22) Filed: Feb. 2, 2004

(65) Prior Publication Data

US 2005/0180501 A1    Aug. 18, 2005

(51) Int. Cl.
- G06K 9/36     (2006.01)
- G06K 9/46     (2006.01)
- G06K 9/00     (2006.01)
- G09G 5/02     (2006.01)
- H04N 7/12     (2006.01)
- H03M 7/42     (2006.01)
- H03M 7/12     (2006.01)

(52) U.S. Cl. .................. 345/601; 345/589; 345/549; 345/555; 345/581; 358/426.04; 382/232; 382/233; 382/162; 382/166; 375/240.1

(58) Field of Classification Search .......... 345/428, 345/581, 589, 600–601, 660, 547, 549, 555, 345/567, 690; 382/162–167, 232–233, 251–254; 358/515–518, 426.04–426.1; 348/393–396, 348/716–720; 341/50–51, 56, 57, 106; 707/1, 707/3, 100; 708/203

See application file for complete search history.

(56) References Cited

U.S. PATENT DOCUMENTS

| | | | | |
|---|---|---|---|---|
| 5,416,614 | A | * | 5/1995 | Crawford .................... 358/530 |
| 5,699,460 | A | | 12/1997 | Kopet et al. |
| 6,008,847 | A | * | 12/1999 | Bauchspies ............ 375/240.01 |
| 6,091,850 | A | | 7/2000 | Ostrovsky |
| 6,247,014 | B1 | * | 6/2001 | Ladwig et al. ............... 707/100 |
| 6,594,386 | B1 | | 7/2003 | Golshani et al. |
| 6,597,815 | B1 | * | 7/2003 | Satoh et al. ................. 382/251 |
| 6,751,623 | B1 | * | 6/2004 | Basso et al. ................. 707/101 |
| 6,785,429 | B1 | | 8/2004 | Senoh |
| 6,933,970 | B2 | * | 8/2005 | Koshiba et al. ............. 348/273 |
| 6,975,767 | B1 | * | 12/2005 | Clark ......................... 382/232 |
| 6,999,511 | B1 | * | 2/2006 | Boice et al. .................. 375/240 |
| 7,010,033 | B2 | * | 3/2006 | Clark ..................... 375/240.01 |
| 2005/0129268 | A1 | * | 6/2005 | Maeno et al. ................ 382/100 |

* cited by examiner

Primary Examiner—Wesner Sajous
(74) Attorney, Agent, or Firm—Sonnenschein Nath & Rosenthal LLP

(57) ABSTRACT

A method and apparatus for decoding, on a pixel-by-pixel basis, audio/video data using a table of encoded pixel parameter values, wherein each pixel is represented by an entry including a dominant pixel color component and by scaling a set of segment reference pixels comprised of segment reference pixel values according to each entry in the table of encoded pixel parameter values to produce decoded pixels comprised of decoded pixel parameter values.

19 Claims, 9 Drawing Sheets

| Segment Reference Pixels | Red Value 353₁ | Green Value 354₁ | Blue Value 355₁ | Luminance Value 356₁ | Chrominance Value 357₁ |
|---|---|---|---|---|---|
| Red | 10000 | 2000 | 500 | 900 | 500 |
| Green | 600 | 10000 | 740 | 600 | 400 |
| Blue | 700 | 1000 | 10000 | 800 | 600 |
| Black | 9000 | 8000 | 8500 | 700 | 500 |

350₁

350₂

| | | | | | |
|---|---|---|---|---|---|
| Black | 10000 | 9000 | 8500 | 7000 | 800 |

350ₙ

| | | | | | |
|---|---|---|---|---|---|
| Black | 8000 | 9500 | 9500 | 650 |

Fig. 3B

Table 320 (400):

| Pixel Number 322 | Scaled Dominant Color Value 323 | Scaled Luminance 326 | Scaled Chrominance 327 | Color Depth 328 |
|---|---|---|---|---|
| 1 | R10 | 9 | 5 | 7 |
| 2 | R9 | 6 | 4 | 5 |
| 3 | G8 | 5 | 5 | 5 |
| 4 | See Pixel 3 | | | |
| 5 | G10 | 6 | 4 | 5 |
| Last Pixel | | | | |

Table 350:

| Segment Reference Pixels | Red Value 353 | Green Value 354 | Blue Value 355 | Luminance Value 356 | Chrominance Value 357 |
|---|---|---|---|---|---|
| Red | 10000 | 2000 | 500 | 900 | 500 |
| Green | 600 | 10000 | 740 | 600 | 400 |
| Blue | 700 | 1000 | 10000 | 800 | 600 |
| Black | 9000 | 8000 | 8500 | 700 | 500 |

Table 420:

| Pixel Number 422 | Red Value 423 | Green Value 424 | Blue Value 425 | Luminance Value 426 | Chrominance Value 427 |
|---|---|---|---|---|---|
| 1 | 10000 | 2000 | 500 | 810 | 250 |
| 2 | 9000 | 2000 | 500 | 540 | 200 |
| 3 | 600 | 8000 | 740 | 300 | 200 |
| 4 | 660 | 8000 | 740 | 300 | 200 |
| 5 | 600 | 10000 | 740 | 360 | 160 |
| Last Pixel | | | | | |

Fig 4

SYSTEM AND METHOD FOR DECODING LIVE AUDIO/VIDEO INFORMATION

FIELD OF THE INVENTION

The present invention relates generally to communication systems and, in particular, to a system and method for decoding encoded live video received over low bandwidth communication links.

BACKGROUND OF THE INVENTION

Video signals can be digitized, encoded, and subsequently decoded in a manner which significantly decreases the number of bits necessary to represent a decoded reconstructed video without noticeable, or with acceptable, degradation in the reconstructed video. Video coding is an important part of many applications such as digital television transmission, video conferencing, video databases, etc.

In video conferencing applications, for example, a video camera is typically used to capture a series of images of a target, such as a meeting participant or a document. The series of images is encoded as a data stream and transmitted over a communications channel to a remote location. For example, the data stream may be transmitted over a phone line, satellite, an integrated services digital network (ISDN) line, or the Internet.

In general, connection of a user interface device to the Internet may be made by a variety of communication channels, including twisted pair telephone lines, coaxial cable, and wireless signal communication via local transceivers or orbiting satellites. Most user interface device Internet connections are made by relatively low-bandwidth communication channels, mainly twisted pair telephone lines, due to the existing infrastructure of such telephone lines and the cost of implementing high-bandwidth infrastructure. This constrains the type of information that may be presented to users via the Internet connection, because video transmissions using presently available coding techniques generally require greater bandwidth than twisted pair telephone wires can provide for optional viewing.

The encoding process is typically implemented using a digital video coder/decoder (codec), which divides the images into blocks and compresses the blocks according to a video compression standard, such as the ITU-T H.263 and H.261 standards. In compression schemes of this type, a block may be compressed independent of the previous image or as a difference between the block and part of the previous image. In a typical video conferencing system, the data stream is received at a remote location, where it is decoded into a series of images, which may be viewed at the remote location. Depending on the equipment used, this process typically occurs at a rate of one to thirty frames per second.

One technique widely used in video systems is hybrid video coding and decoding. An efficient hybrid video coding system is based on the ITU-T Recommendation H.263. The ITU-T Recommendation H.263 adopts a hybrid scheme of motion-compensated prediction to exploit temporal redundancy and transform coding using the discrete cosine transform (DCT) of the remaining signal to reduce spatial redundancy. Half pixel precision is used for the motion compensation, and variable length coding is used for the symbol representation.

However these techniques still do not provide adequate results for the low-bandwidth connections such as dial-up connections or wireless device networks (e.g., GSM or CDMA) that have data transmission rates as low as 9.6 kilobits/sec, 14.4 kilobits/sec, 28.8 kilobits/sec or 56 kilobits/sec. For users at the end of a dial-up connection or wireless network, high quality video takes extraordinary amounts of time to download. Streaming high quality video is nearly impossible, and providing live video feeds is generally unfeasible.

SUMMARY OF THE INVENTION

A method and apparatus, according to one embodiment of the present invention, are utilized and configured to decode, on a pixel-by-pixel basis, audio/video data using a table of encoded pixel parameter values, wherein each pixel is represented by an entry including a dominant pixel color component and by scaling a set of segment reference pixels comprised of segment reference pixel values according to each entry in the table of encoded pixel parameter values.

In one embodiment of the present invention, each set of the segment reference pixels corresponds to an encoded segment of a frame and the set of the segment reference pixel values comprises a unique set of color pixels for each encoded segment. Each segment reference pixel represents a pixel with a most intense dominant pixel color component for each encoded segment. The set of segment reference pixels may include a representative red pixel, green pixel, blue pixel, and black pixel.

In one embodiment of the present invention, scaling the set of segment reference pixel values comprises scaling the segment reference pixel's dominant color pixel value, non-dominant pixel color values, and luminance and chrominance values.

In one embodiment of the present invention, the table of encoded pixel values further comprises redundant entries. Each one of the redundant entries is decoded by recalling the previously decoded pixel parameter values associated with each one of the redundant entries. In another embodiment, the table of encoded pixel values includes non-dominant pixel color components.

In one embodiment of the present invention, the set of segment reference pixels are comprised of full-scale pixel parameter values and scaling the set of segment reference pixel values further comprises scaling each of the full-scale pixel parameter values with the each corresponding encoded pixel parameter values. In various embodiments the full-scale segment reference pixels are located at the decoder or are included and communicated with the table of encoded pixel values.

Among various embodiments of the present invention, the audio data is included with a file containing the table of pixel parameters or may be communicated in one or more separate files. In one embodiment, the decoding process includes synchronizing the received audio data associated with the decoded table of encoded pixel parameter values. The process may also include communicating the decoded table of pixel parameter values and the synchronized audio data to a playback device.

In one embodiment of the present invention, the decoding process may include processing a file comprised of a header, the table of encoded pixel parameters, and the segment reference pixels by using the header to determine data locations within the file, including the beginning and end of the table of encoded pixel parameter values and the corresponding segment reference pixel values.

BRIEF DESCRIPTION OF THE DRAWINGS

The present invention will be understood and appreciated more fully from the following detailed description taken in conjunction with the drawings in which:

FIG. 3B illustrates a segment reference pixel table, according to one embodiment of the present invention;

FIG. 4 illustrates the decoding of a compressed video file, according to one embodiment of the present invention;

DETAILED DESCRIPTION

Figure 1:
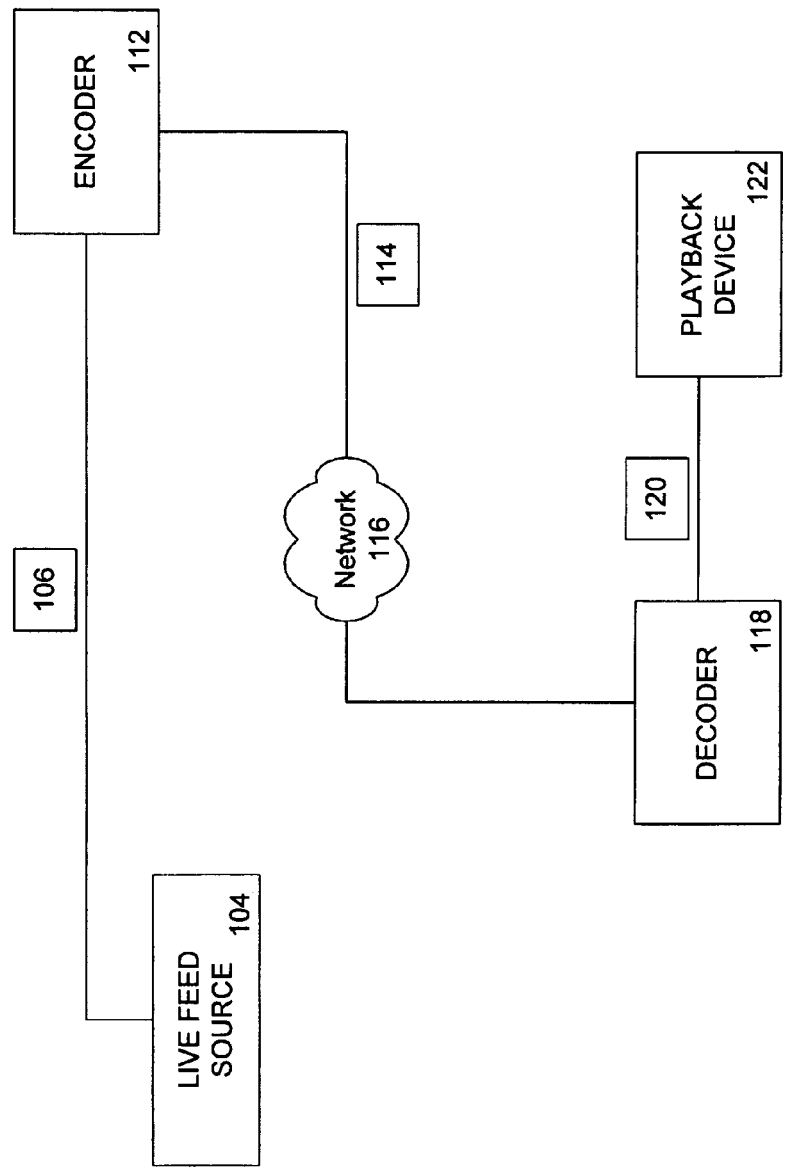
FIG. 1 is a block diagram of an exemplary system for compressing streamed or live video, according to one embodiment of the present invention.

A system and method for encoding video are described. The present encoding system and method overcome prior deficiencies in streaming live video content by encoding and decoding video data such that high-quality video transmission over low bandwidth communication links is possible. In the following description, for purposes of explanation, numerous specific details are set forth in order to provide a thorough understanding of the present invention. It will be evident, however, to one skilled in the art that the present invention may be practiced without these specific details. In some instances, well-known structures and devices are shown in block diagram form, rather than in detail, in order to avoid obscuring the present invention. These embodiments are described in sufficient detail to enable those skilled in the art to practice the invention, and it is to be understood that other embodiments may be utilized and that logical, mechanical, electrical, and other changes may be made without departing from the scope of the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of acts leading to a desired result. The acts are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, signals, datum, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention can be implemented by an apparatus for performing the operations herein. This apparatus may be specially constructed for the required purposes, or it may comprise a general-purpose computer, selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and processes presented herein are not inherently related to any particular computer or other apparatus. Various general-purpose systems may be used with programs in accordance with the teachings herein, or it may prove convenient to construct more specialized apparatus to perform the required method. For example, any of the methods according to the present invention can be implemented in hard-wired circuitry, by programming a general-purpose processor or by any combination of hardware and software. One of skill in the art will immediately appreciate that the invention can be practiced with computer system configurations other than those described below, including hand-held devices, multiprocessor systems, microprocessor-based or programmable consumer electronics, DSP devices, network PCs, minicomputers, mainframe computers, and the like. The invention can also be practiced in distributed computing environments where tasks are performed by remote processing devices that are linked through a communications network. The required structure for a variety of these systems will appear from the description below.

The methods of the invention may be implemented using computer software. If written in a programming language conforming to a recognized standard, sequences of instructions designed to implement the methods can be compiled for execution on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, application, etc.), as taking an action or causing a result. Such expressions are merely a shorthand way of saying that execution of the software by a computer causes the processor of the computer to perform an action or produce a result.

FIG. 1 is a block diagram of an exemplary system 100 for live video compression, according to one embodiment of the present invention. Video compression system 100 is designed to encode and deliver high quantity live video over low bandwidth transmission links (e.g., 9.6-56 kBps). In one embodiment of the present invention, video compression system 100 obtains video from a live feed source 104, such as a camera recording a live sporting event. Among varying embodiments, the source contributing video data to be streamed "live" may also be any device capable of delivering video content, such as a digital versatile disc (DVD), a computer storage device, or digital video tape It should be noted, analog video storage devices may also be used so long as the video stored thereon is first converted to a digital format prior to "live" encoding.

A live feed source 104 produces digital output video signals in a raw data file format. Generally, audio signals accompany the video signals from source devices such as live feed source 104. The audio signals may be digitized and/or compressed and provided along with the raw video data, either in a separate file or appended to the video file. In one embodiment of the present invention, the audio data may be processed independent of the raw video data 106 according to any audio compression method including the MPEG's (Moving Picture Experts Group) "MP3" or Microsoft's "wav" format. Such audio may be synchronized with the video data file 106 at any point within the compression system 100.

The raw video data 106, including a start stream header, is provided to an encoder 112. The start stream header is included at the start of the stream of raw video data 106 and may include information regarding the audio data and raw video data 106, such as video frame starting and ending points, video tag information, the number of video frames per second, frame resolution (i.e., the number of pixels per frame), color depth information, audio synch information, and similar data regarding the video data stream that may be used by the encoder 112.

Compression system 100 uses the encoder 112 to compress raw video data 106 for streaming video to a decoder at or near real-time. The details of the encoding process performed by encoder 112 will be discussed below. The encoder 112 produces a compressed or encoded video file 114, which may include for each frame group, segment reference pixel values, encoded pixel data for all frames within the frame group, and header information for an encoded frame group, such as resolution settings for the decoder and audio/video synch information. In another embodiment, a trailer within the compressed video file may be generated that may include other audio/video information such as a pointer identifying the next frame group to be decoded. The majority of the compressed video file 114 is a frame group table of pixel parameter values for each pixel of each video frame comprising the acquired video. Encoder 112 may also produce an audio output file that may or may not be compressed, as discussed above. For purposes of this specification, reference to the compressed video file 114 includes any audio/visual data, optional data and/or header and trailer information. It should be appreciated, however, that in other embodiments, the header, the trailer, the compressed video data, and audio data may be written to separate files or appended to one or more files in any combination thereof.

The compressed video file 114 may be transmitted over a network 116 to the decoder 118. The decoder 118 decodes the compressed video file 114 to include a decompressed video file 120 and synchronizes the audio data (if any) for audio/visual viewing via playback device 122. Playback device 122 may be any device accepting video data such as a television, cellular phone display, personal computer, personal digital assistant (PDA), automobile navigation system, or other similar device capable of displaying video data. The process performed by the decoder 118 will be described in detail below.

Figure 2:
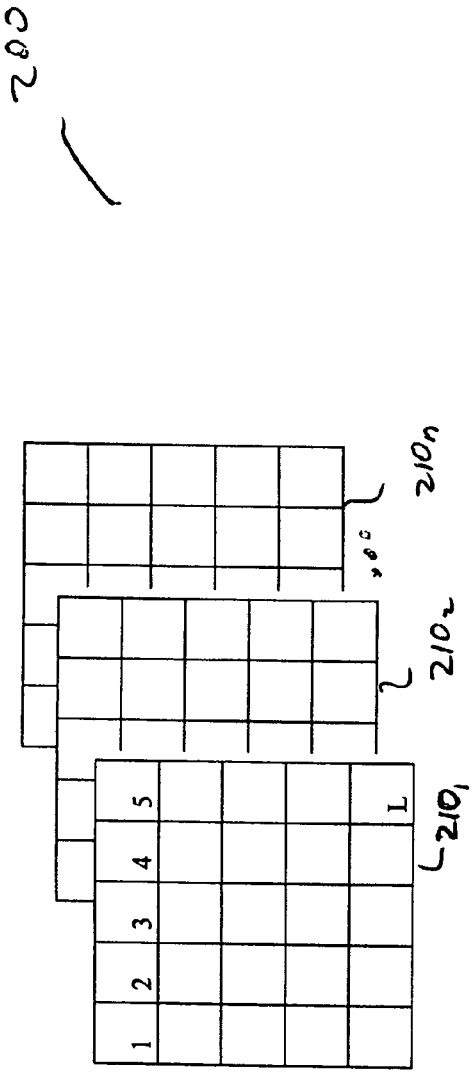
FIG. 2 illustrates a sequence of video frames with its corresponding raw video data, according to one embodiment of the invention.

FIG. 2 illustrates a sequence of video frames with its corresponding table of raw video data, according to one embodiment of the present invention. Video sequence 200 is composed of a number of video frames $210_1$-$210_n$. Each video frame 210 is composed of thousands of pixels. The exact number of pixels in a frame depends upon the digital video format and more specifically, the frame resolution used. The present method and system support High Definition Digital TV (HDTV), National TV Standards Committee (NTSC) having 30 interlaced frames per second at 525 lines of resolution with an audio FM frequency and a MTS signal for stereo, Phase Alternating Line (PAL) standards having 25 interlaced frames per second at 625 lines of resolution, System en coleur avec memoire (SECAM) and similar protocols. It should be noted, however, any analog audio/video format is to be converted to a digital audio/video format prior to encoding by encoder 112.

Live feed source 104 generates frames 210 and provides the raw video data file 106 that describes video frames $210_{1-n}$ and their corresponding pixels. The raw video data file 106 contains the raw video frame data tables $220_{1-n}$, where n represents the number of frames, and each row 231-236 corresponds to pixels in each video frame 210, where the pixels between 235 and the last pixel 236 have been omitted for clarity. The columns of each raw video frame data table 220 describe the pixel numbers 222, red color component values 223, green color component values 224, blue color component values 225 (RGB values), luminance values 226, and chrominance values 227 for each pixel in the respective frame 210. In alternate embodiments, other color spaces may be used such as, cyan, magenta, and yellow (CyMgYl).

As illustrated with reference to FIG. 2, each pixel parameter 223-227 of each pixel 222 in each frame table 220 requires multiple bytes of information to be stored per pixel, thus creating large file sizes for multiple frames of video data. Considering high quality video requires at least a frame rate of 25 frames per second or 1,500 frames/minute, it should be apparent that the amount of storage and/or bandwidth required to stream and play an uncompressed or slightly compressed video file is quite large.

Figure 3A:
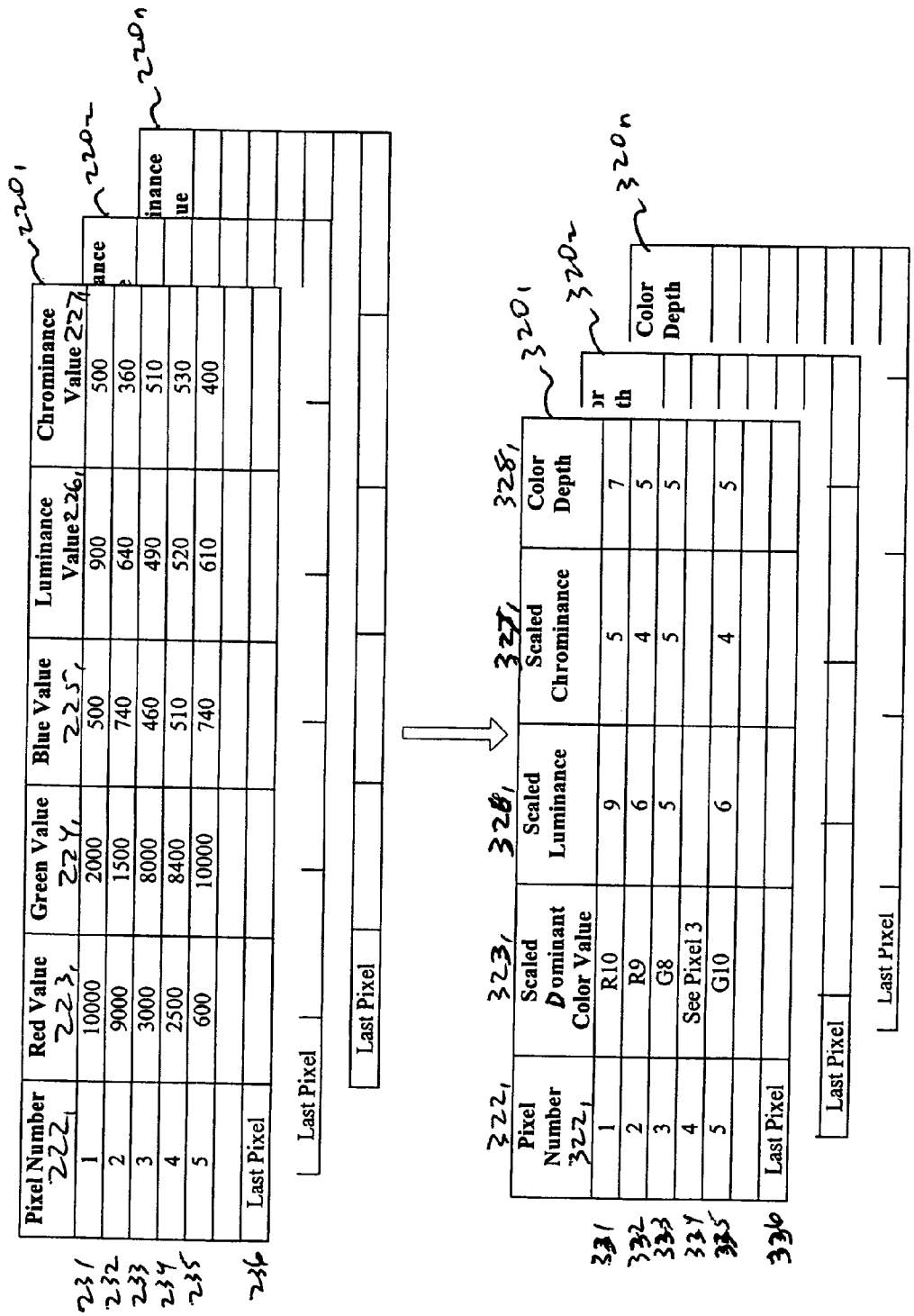
FIG. 3A illustrates the encoding of a raw video table, according to one embodiment of the present invention.

FIG. 3A illustrates a table of raw video data $220_1$ encoded into a frame group table $320_1$, according to one embodiment of the present invention. The pixel numbers in column $222_1$, are mapped to pixel numbers in column $322_1$. For each row, 231-236, of raw pixel data in table $220_1$ there is a corresponding row, 331-336, of compressed pixel data in table $320_1$, where the pixels between 235 (335) and the last pixel 236 (336) have been omitted for clarity. The pixel value sets (i.e., RGB values $223_1$-$225_1$) are processed and mapped to dominant color value $323_1$, as illustrated by pixel 1 value R10 in table $320_1$. The calculation of the dominant color value $323_1$, will be discussed below. The luminance value $226_1$ is mapped to a scaled luminance value $326_1$ and the chrominance value $227_1$ is mapped to a scaled chrominance value $327_1$. The calculation of scaled chrominance and luminance values $327_1$, $326_1$ will also be discussed below. Each compressed video table 320 may further include color depth values 328. In one embodiment, the color depth value 328 is the average of the scaled chrominance and luminance values 327, 326. According to one embodiment, as encoder 120 populates compressed video table 320, if a row of compressed pixel data is determined to be identical or at least sufficiently similar to a previously populated row, encoder 112 places a pointer to the appropriate previously entered row, as illustrated with reference to 334.

FIG. 3B illustrates pixel reference value sets $350_{1-n}$ generated by encoder 112, where n is the number of encoded segments for each frame group. The segment reference pixel value sets 350, according to one embodiment of the present invention, may have up to four (4) reference pixel values corresponding to red 361, green 362, blue 363 and black 364 for each segment of a video frame 210. The segment reference pixels are selected based upon the video frame 210's most intense dominant pixel color values for each encoded segment, as illustrated by red $361$, green $354_1$, blue $363$, and black $364$. The most intense dominant pixel color value is based on the highest raw pixel color values. The black segment reference pixel $356$, according to one embodiment of the present invention, may be determined by comparing the color component values (e.g., RGB) in aggregate. The segment reference pixel values may also include pixel parameter values, such as luminance value $356_1$ and chrominance value $357_1$ for each of the segment reference pixel colors $361$-$364$. In other embodiments, the segment reference pixel values may also be scaled or alternatively, the reference pixel values may be full-scale values corresponding to the raw data format. In alternate embodiments, additional reference values may be used for color depth or other similar graphics data or pixel parameters. Calculation of the pixel reference value sets $350$ will be discussed in greater detail below.

FIG. 4 illustrates an exemplary decoding process $400$ for a compressed video file $114$, according to one embodiment of the present invention. Compressed video file $114$ may include a frame group header, segment reference pixel values $350$, and encoded video tables $320$ for each video frame $210$. Decoder $118$ processes compressed video file $114$ to provide a decoded video file $120$. Decoded video file $120$ includes a decoded video table $420$ including decoded pixel parameter values $422$-$427$ for each pixel $431$-$436$. Decoding process $400$ includes the mapping of a compressed video table $320$ to a decoded video table $420$ using segment reference pixel values $350$. The pixel data $331$-$336$ is decoded using table $350$ and is respectively mapped to pixel data $431$-$436$. The process performed by decoder $118$ to populate decoded video table $420$ will be described in detail below.

The decoded video file $120$ can be formatted for playback devices supporting different input protocols. Such protocols include NTSC, SECAM, PAL and HDTV as described above. Additionally, support for computer displays is provided. If a low-bandwidth communication link exists between display $122$ and decoder $118$, decoder $118$ may be configured, in one embodiment, to transmit a fraction of the lines per frame. In another embodiment, in order to minimize bandwidth consumption, the encoder $112$ may encode only a fraction of the lines per frame, such as one of two fields of video, resulting in a smaller compressed video file $114$ for transmission over network $116$. In other embodiments, the video frames may be encoded in their entirety but a field is removed and/or the screen resolution is reduced prior to transmission over network $116$. In yet another embodiment, frames may be dropped prior to transmission. For example, a file encoded at 24 frames per second may be reduced to 12 frames per second by dropping ever other frame prior to transmission. These embodiments may be particularly useful when the playback device $122$ is a cellular telephone or other wireless device, requiring high quality video over low bandwidth networks, such as GSM, CDMA, and TDMA.

Figure 5:
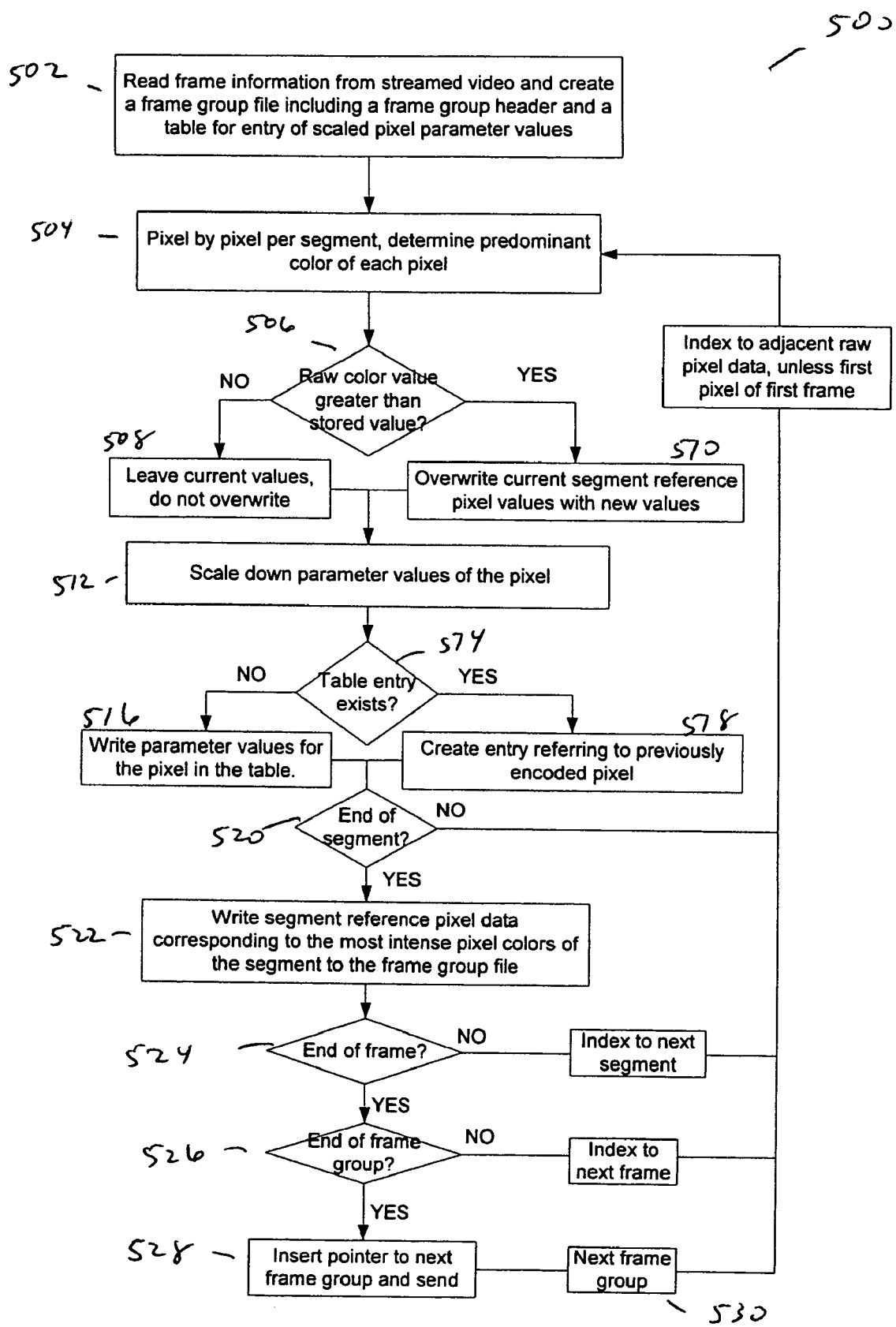
FIG. 5 is a flow diagram showing an example of an encoding process, according to one embodiment of the present invention.

FIG. 5 illustrates a flowchart of encoding process $500$ for encoding live or streaming video content, according to one embodiment of the present invention. As discussed with reference to FIG. 1, encoder $112$ receives raw video data $106$ for encoding. The encoder $112$ then provides a compressed video file $114$, including frame group header, segment reference pixel values $350$, frame group table $320$, and any additional parameters and optional information described above, to a decoder $118$ via network $116$.

In one embodiment of the present invention, the encoder $112$ receives the digitized video data as raw video data $106$. At block $502$, the encoder $112$ determines from the raw video data $106$ the video format and frame information, and creates a frame group file in which a frame group header, a table of scaled pixel parameter values, and reference pixels will be stored. In another embodiment, the audio is also stored in the frame group file. The raw video data $106$ may be of any format known in the art such as MPEG (Moving Picture Experts Group), MJPEG (moving JPEG (Joint Photographic Experts Group)), QuickTime's AVI (audio video interleaved), among others.

For example, with reference to FIG. 2, the encoder $112$ receives raw pixel data for frames $210$ as further illustrated in the raw pixel data tables $220$. At block $504$, the encoder $112$ determines, pixel by pixel and per segment, the dominant color of each pixel by examining each pixels color component values. For example, pixel one data $231$ includes a red color component value $223_1$ of 10,000, a green component value $224_1$ of 2,000, and a blue component value $225_1$ of 500. Therefore, in one embodiment pixel 1's dominant color value would correspond to the highest numerical value among the three color values (RGB) which is the red value of 10,000. In other embodiments other techniques for calculating the dominant color may be used, such as weighted color component value comparisons. At block $506$, the current pixel's color component values are compared to the highest previously stored values for that color component in order to determine the segment reference pixels corresponding to the most intense pixels for each color for each segment. In the case of a black pixel or segment reference pixel, according to one embodiment of the present invention, the color component values would all have to be above a threshold value. For example, black segment reference pixel $364$ has red, green and blue values of 9000, 8000,and 8500, respectively. Although the values may not be the highest value for each color (e.g., red segment reference pixel $361$ red value of 10000), the black segment reference pixel corresponding to the most intense black pixel of the segment, is the pixel with the highest of all three color component values, red, green and blue. If any one of the values is below a threshold value, the higher of the remaining two values determines the color pixel. An exemplary threshold value may be eighty percent of the maximum color component value for each color (e.g., 80% of 10000=8000). In another embodiment, a white segment reference pixel and white dominant pixel table values are based upon the color component values being below a threshold value. Continuing at block $508$, if the current color component value(s) is (are) not greater than the stored segment reference pixel value(s), the stored values remain unchanged. However, if the current color component value(s) is (are) greater than the stored value(s) then the encoder $112$ overwrites the current segment reference pixel values corresponding to that color component with the new values.

A segment may be defined as any portion of a frame or frames. For example, with reference to FIG. 2, a segment may be defined as the first line of a frame as shown in $210_1$ pixels 1 to 5. Among various embodiments, a segment may be multiple frames, two lines of a frame or half of a frame. It should be appreciated that the segment size definition may be optimized to accommodate a variety of systems to minimize encoder processor overhead and maximize the frame transfer rate for streaming video content over a low-bandwidth connections.

An example illustrating the concept of storing the segment reference pixel values is shown with reference to FIGS. 3A and 3B, respectively. As shown in table $220_1$ of FIG. 3A, pixel parameters $231$ and $232$ each indicate that the dominant color for each pixel is red based upon a comparison of their respective RGB values. However, the red value for pixel one of 10,000 is greater than that of pixel two 9,000 and therefore would remain as the red segment reference pixel as shown in table 350 of FIG. 3B. The segment reference pixel also retains its other pixel parameters such as green color component value 354$_1$, blue color component value 355$_1$, luminance value 356$_1$, and chrominance value 357$_1$. In other embodiments, all or some of these values may be scaled or otherwise manipulated to decrease table size or alter display characteristics.

After the dominant color of each pixel is determined and the color component values are compared to the stored segment reference pixel values, the pixel parameters, at block 512, are scaled down and stored in the table. In one embodiment, as illustrated with reference to FIG. 3A table 320$_1$, the scaled pixel values include scaled predominant color value 323$_1$, scaled luminance value 326$_1$, scaled chrominance value 327$_1$, and a calculated color depth value 328$_1$. In one embodiment of the present invention, only the dominant color value, luminance value, and chrominance value are scaled down and stored in the table. In another embodiment, all of the raw pixel parameter values are scaled down and stored within the table, including the non-dominant color values.

In one embodiment of the present invention, as shown in FIG. 3A, the pixel parameters 231-235 are scaled down into a one through ten (1-10) scale as shown with scaled pixel parameters 331-335 of table 320$_1$. For example, pixel parameter row 233 of table 220$_1$ indicates the dominant pixel color is green with a green color component value of 8,000 and a luminance and chrominance value of 490 and 510, respectively. If full-scale raw color values were 10,000, then the dominant color value may be rounded to the nearest thousand and divided by the full scale to produce a 1-10 value. For example:

Green dominant raw (Gd) value of 8000 (note, a value 8200 would round to 8000);

$$\frac{\text{Scaled Value }(Gd)}{10} = \frac{8000}{10000}; \text{Scaled } Gd = G8$$

As shown in scaled pixel parameter row 333 of table 320$_1$, wherein a dominant green color value of 8,000 becomes G8. Similarly, if the luminance and chrominance have full-scale values of 1,000, those values for pixel parameter row 233 would each become 5, respectively. For example:

Luminance (Lm) value of 490 rounds up to 500;

$$\frac{\text{Scaled } Lm}{10} = \frac{500}{1000}; \text{Scaled } Lm = 5$$

(Similar calculation for chrominance)

In one embodiment, the color depth is calculated based upon the average of the scaled down luminance and chrominance values and as illustrated in table 320$_1$. In another embodiment, the calculation is performed at the decoder. In yet other embodiments, the raw values may be scaled into any number of ranges, such as a 1-25 scale.

Once the pixel parameters are scaled down and prior to storing the parameters in the table, the encoder 112, checks the current pixel parameter values with previously stored values in the table. If the scaled down parameter values are unique, at block 516, encoder 112 writes the parameter values for the pixel into the table. However, if an identical or sufficiently similar (e.g., within a tolerance amount) table entry already exists, the encoder 112, at block 518, creates an entry for the current pixel that refers to the previously encoded pixel in the table. For example, with reference to FIG. 3A, pixel parameter row 234, if scaled according to the process described above, would have identical scaled dominant pixel color, luminance, and chrominance to that of pixel parameter row 233. Therefore, encoder 112 inserts a reference to the previously encoded pixel as shown with reference to table 320$_1$ row 334. It should be appreciated that in dealing with tens of thousands of pixels, the combination of scaling down the dominant color, luminance, and chrominance values in addition to inserting pointers for redundant pixel values will result in a significant reduction in the size of the encoded pixel table over that of the raw pixel table, and thus the amount of bandwidth required to transmit this information to a decoder is reduced.

The encoder 112, at block 520, checks whether or not the encoding has reached the end of the segment. If the end of the segment has not been reached, then encoder 112 indexes to the next pixel corresponding to the next pixel parameter row and repeats blocks 506 through 518.

At the end of each segment, at block 522, the encoder 112 retrieves the segment reference pixel values corresponding to the most intense dominant pixel colors for the segment and writes those segment reference pixels to the frame group file. In one embodiment of the present invention, the coordinates assigned to a segment reference pixel are the coordinates of the pixel prior to a pixel color change within the segment, or if there is not a color change leading up to the end of the segment, the segment reference pixel coordinates for that color are the coordinates of the last pixel of the segment. In other embodiments, the segment reference pixels may be stored, by coordinate references or otherwise, according to any programming method that would allow for the values to be scaled according to the encoding method described above.

If a segment only has fewer than four reference pixel colors represented therein, then there may be fewer than few segment reference pixels associated with that segment. For example, if a segment includes a row of five pixels, as illustrated with reference to FIGS. 2 and 3, table 320 illustrates that the segment only includes dominant color values of red and green and therefore will only have a red and green segment reference pixels as further illustrated in FIG. 3B, segment reference pixel data 361 and 362. Therefore, in this example, the encoder 112 would only write segment reference pixel data corresponding to the most intense red and green pixel colors of the segment to the frame group file.

Once the encoder 112 writes the segment reference pixel data to the frame group file, the encoder 112, at block 524, determines if it has reached the end of the frame in the encoding process. If the process has not reached the end of the frame, the encoder 112 indexes to the next segment and repeats blocks 504 through 520. If another frame has been reached, at block 526, the encoder 112 determines whether it has encoded the entire frame group. If the entire frame group has not been encoded, the encoder 112 indexes to the next frame and repeats blocks 504 through 524. However, if the end of the frame group has been reached, the encoder 112, at block 528, inserts a pointer used by the decoder 118 to identify the next frame group for decoding. Thereafter, the encoder 112 communicates the frame group in the compressed video file 114 through the network 116 to the decoder 118. At block 530, the encoder 112 begins encoding the next frame group and repeats blocks 404 through 528. In one embodiment, the frame group file includes multiple tables comprised of multiple frames. For example, a table may include pixel information for 25 frames and a frame group may include five tables thus equaling 125 frames per frame group.

Figure 6:
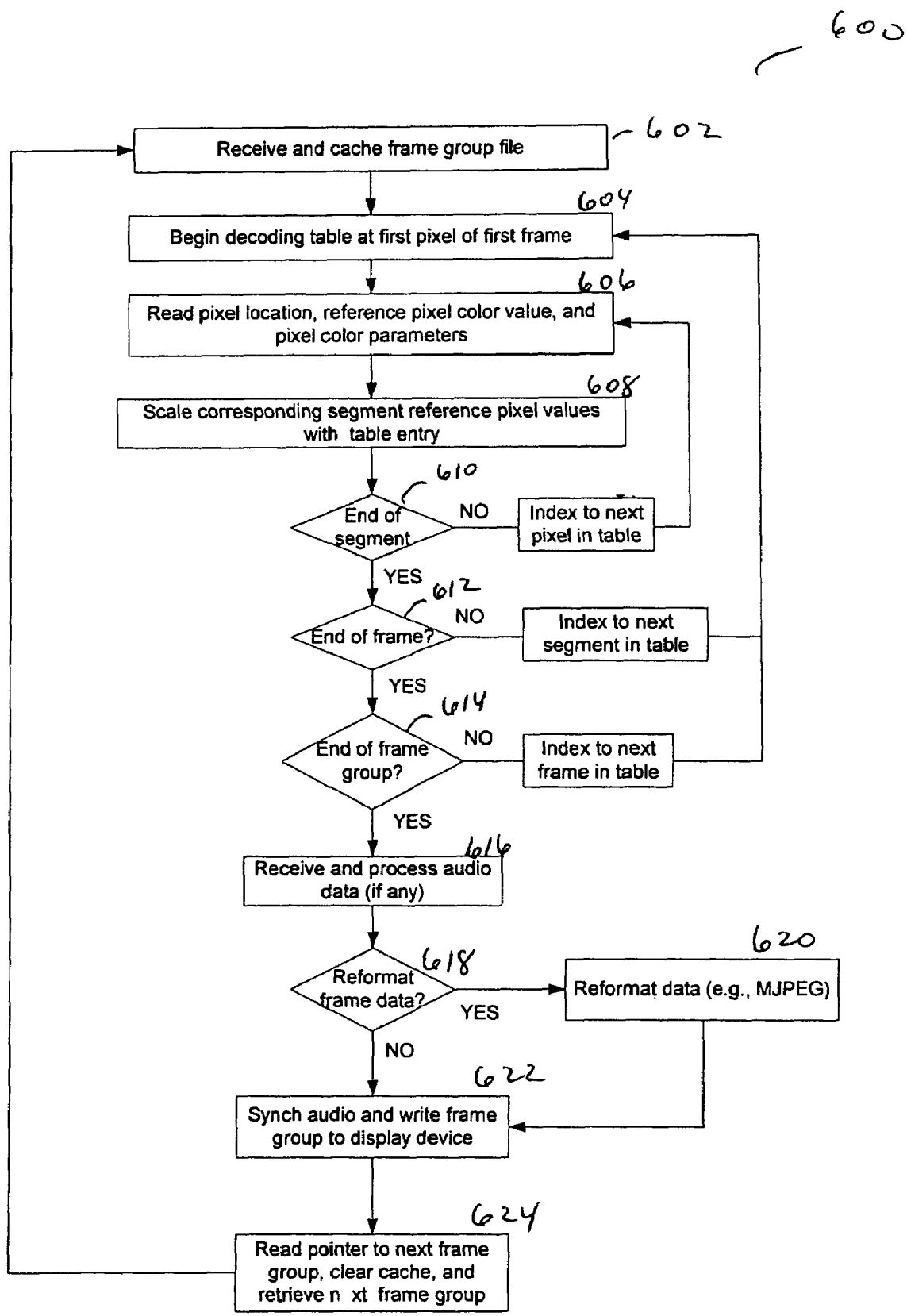
FIG. 6 is a flow diagram illustrating an example of a decoding process, according to one embodiment of the present invention.

FIG. 6 illustrates a flowchart of a decoding process 600, according to one embodiment of the present invention. As discussed with reference to FIG. 1, decoder 118 receives the compressed video file 114 through network 116. After decoding, the decoder 118 supplies decoded video data 120 to playback device 122.

The decoding process 600 begins at block 602 by receiving and caching (temporarily storing) the compressed video file 114 from network 116. At block 604, the decoder 118 begins decoding the scaled table of pixel parameter values beginning at the first pixel of the first frame. The decoder 118 reads from the table, the pixel location, reference pixel color value, luminance and chrominance. At block 608, the decoder 118 scales the corresponding segment reference pixel values according to the table of pixel parameter values.

For example, with reference to FIG. 4, the decoder 118 uses the encoded pixel parameter values of table $320_1$ and the segment reference pixels of table $350_1$ to generate decoded pixel parameter values as illustrated in table $420_1$. For example, using the scaled dominant color value G8 of pixel three, the scaled luminance and chrominance of 5, and the green segment reference pixel 362 results in decoded pixel three values of table $420_1$.

For example:
Pixel parameter values of G8 (G, use green segment reference pixel), luminance (Lm) 5, and chrominance (Cm) 5, from table $350_1$:
Segment Reference Pixel G—R600, G10000, B740, Lm600, Cm400.
Non-dominant R and B remain the same, scale dominant G Lm and Cm:

$$\frac{8}{10} = \frac{\text{Scaled } G\ (Gs)}{10000}; Gs = 8000; Rs = 480; Bs = 592$$

$$\frac{5}{10} = \frac{\text{Scaled } Lm}{600}; Lm = 300; \frac{5}{10} = \frac{\text{Scaled } Cm}{400}; Cm = 200$$

Therefore, the decoded table entry would appear as illustrated in 433 of table 420 and is duplicated below:
Decoded Pixel 3—R600, G8000, B740, Lm300, Cm200;
In another embodiment, R and B are scaled by the same factor of 0.8, similar to the calculation for Gs, above.

In another embodiment, however, the scaled values of the table may include the non-dominant colors that may also be decoded with reference to the segment reference pixels. In other embodiments, the segment reference pixel values are the original raw full-scale values, and are either communicated with the table of scaled values or are resident within the decoder system.

In the case where an entry in the table of scaled pixel values is a reference pointer to a previous pixel entry, the decoder 118 duplicates the decoded results of previous pixel entry.

The decoder 118 indexes to the next pixel to decode in the segment if it is determined, at block 610, that the segment has not been fully decoded. If the end of the segment has been reached, the decoder 118 determines at block 612 if the end of the frame has been reached. If not, then the decoder 118 begins decoding the next segment of the frame using the process described above. If the entire frame has been decoded, the decoder determines, at block 614, if the entire frame group has been decoded. If not, the decoder 118 begins decoding the next frame in the table. If the entire frame group has been decoded, the encoder 118, at block 616, receives and decompresses (if necessary) any audio data associated with the previously decoded frame group. At block 618, the decoder determines if the frame data requires reformatting for display. In one embodiment of the present invention, the user of the display device configures the decoder to format the decompressed video data 120 to accommodate various playback devices, such as Microsoft's Windows Media Player. If reformatting is required, reformatting is executed at block 620 and decoder, at block 620 synchronizes the audio and writes the decoded frame group to the playback device 122.

After decoding and displaying the decoded frame group, according to one embodiment of the present invention, the decoder 118 at block 624, reads from the frame group the pointer to the next frame group for decoding, and clears the previously decoded frame group from the cache. In one embodiment, the decoder may read a trailer appended to the communicated file. The trailer may provide the decoder with audio/video information, such as the logical location or name of the next frame group to decode, the number of frames and or files remaining in the encoded video, index information to the next file, or other audio/video information related to playback.

Having discussed numerous illustrations of encoding and decoding functions according to the present method and system, a brief description of the communication network and computer architecture encompassing the present system is provided.

An Exemplary Network Architecture

Figure 7:
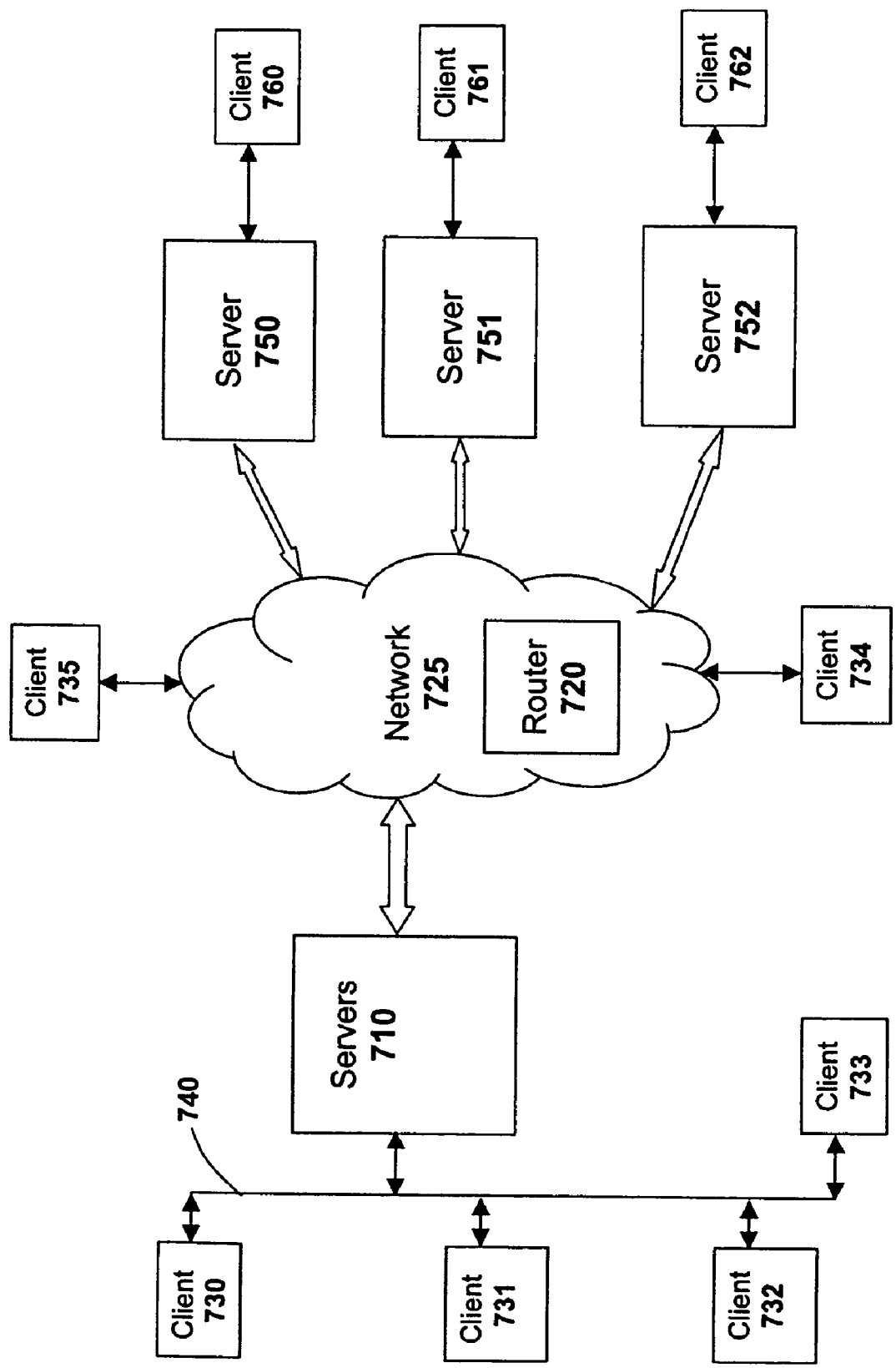
FIG. 7 illustrates an exemplary network architecture for use according to one embodiment of the present invention.

Elements of the present invention may be included within a client-server based system 500 such as that illustrated in FIG. 7. One or more servers 710 communicate with a plurality of clients 730-735. The clients 730-735 may transmit and receive data from servers 710 over a variety of communication media including (but not limited to) a local area network 740 and/or a larger network 725 (e.g., the Internet). Alternative communication channels such as wireless communication via GSM, TDMA, CDMA, Bluetooth, IEEE 802.11, or satellite broadcast (not shown) are also contemplated within the scope of the present invention.

Servers 710 may include a database for storing various types of data. This may include, for example, specific client data (e.g., client account information and client preferences) and/or more general data. The database on servers 710 in one embodiment runs an instance of a Relational Database Management System (RDBMS), such as Microsoft™ SQL-Server, Oracle™ or the like. A user/client may interact with and receive feedback from servers 710 using various different communication devices and/or protocols. According to one embodiment, a user connects to servers 710 via client software. The client software may include a browser application such as Netscape Navigator™ or Microsoft Internet Explorer™ on the user's personal computer, which communicates to servers 710 via the Hypertext Transfer Protocol (hereinafter "HTTP"). Among other embodiments, software such as Microsoft's Word, Power Point, or other applications for composing and presentations may be configured as client decoder/player. In other embodiments included within the scope of the invention, clients may communicate with servers 710 via cellular phones and pagers (e.g., in which the necessary transaction software is electronic in a microchip), hand-held computing devices, and/or touch-tone telephones.

Servers 710 may also communicate over a larger network (e.g., network 725) to other servers 750-752. This may include, for example, servers maintained by businesses to host their Web sites—e.g., content servers such as "yahoo.

com." Network 725 may include router 720. Router 720 forwards data packets from one local area network (LAN) or wide area network (WAN) to another. Based on routing tables and routing protocols, router 720 reads the network address in each IP packet and makes a decision on how to send if based on the most expedient route. Router 720 works at layer 3 in the protocol stack.

According to one embodiment of the present method and system, components illustrated in FIG. 1 may be distributed throughout network 700. For example, video sources may be connected to any client 730-735 or 760-762, or sever 710 or 750-752. Live feed source 104 encoder 112, decoder 118 and display 122, may reside in any client or server, as well. Similarly, all or some of the components of FIG. 1, may be fully contained within a signal server, or client.

In one embodiment, servers 750-752 host video acquisition device 104 and encoder 112. Video sources connected to clients 760-762 provide source video to servers 750-752. Servers 750-752 encode and compress the live source video and deliver the compressed video file 114 upon a client request. Upon client 730-732 request, servers 750-752 transmit the compressed video file 114 over network 116 to the client 730-733 via server 710. In addition, server 710 and the client 730-733 may be connected via a dial-up connection between 9.6 kBps and 56 kBps. Clients 730-733 hosts decoder 118, and upon receiving the compressed video file 114, decodes the file 114 and provides the decoded video file 120 to an attached playback device. Numerous combinations may exist for placement of encoder 112, decoder 118 and video acquisition device 104. Similarly, encoder 112, decoder 118 and live feed source 104 may exist software executed by a general purpose processor, a dedicated video processor provided on an add-on card to a personal computer, a PCM-CIA card, an ASIC (application specific integrated circuit) or similar devices. Additionally, decoder 118 may reside as a software program running independently, or as a plug-in to a web browser. Decoder 118 may be configured to format its video output to have compatibility with existing playback devices that support motion JPEG, MPEG, MPEG-2, MPEG-4 and JVT standards.

An Exemplary Computer Architecture

Figure 8:
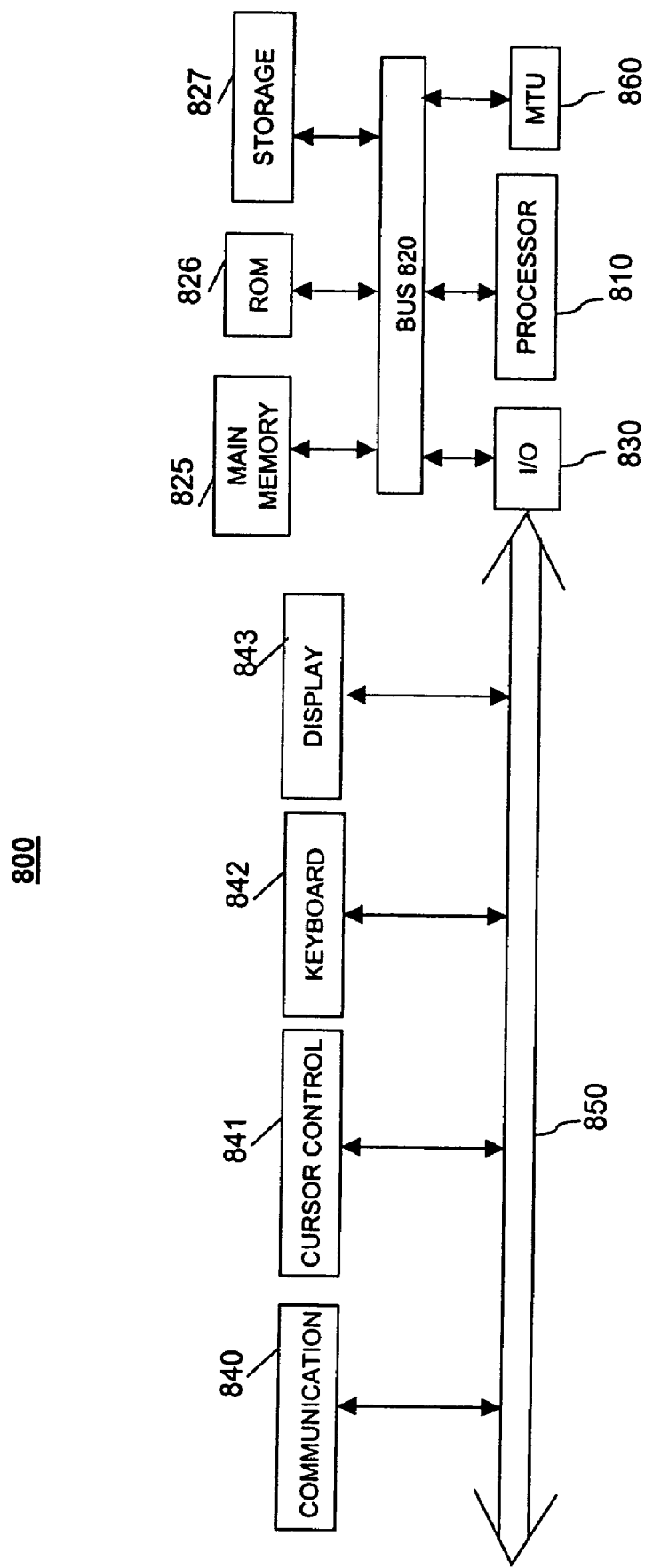
FIG. 8 illustrates an exemplary computer architecture for use according to one embodiment of the present invention.

Having briefly described an exemplary network architecture which employs various elements of the present invention, a computer system 600 representing exemplary clients 730-735 and/or servers (e.g., servers 710), in which elements of the present invention may be implemented will now be described with reference to FIG. 8.

One embodiment of computer system 800 comprises a system bus 820 for communicating information, and a processor 810 coupled to bus 820 for processing information. Computer system 800 further comprises a random access memory (RAM) or other dynamic storage device 825 (referred to herein as main memory), coupled to bus 820 for storing information and instructions to be executed by processor 810. Main memory 825 also may be used for storing temporary variables or other intermediate information during execution of instructions by processor 810. Computer system 800 also may include a read only memory (ROM) and/or other static storage device 826 coupled to bus 820 for storing static information and instructions used by processor 810.

A data storage device 827 such as a magnetic disk or optical disc and its corresponding drive may also be coupled to computer system 800 for storing information and instructions. Computer system 800 can also be coupled to a second I/O bus 850 via an I/O interface 830. Multiple I/O devices may be coupled to I/O bus 850, including a display device 843, an input device (e.g., an alphanumeric input device 842 and/or a cursor control device 841). For example, video news clips and related information may be presented to the user on the display device 843.

The communication device 840 is for accessing other computers (servers or Clients) via a network 725, 740. The communication device 840 may comprise a modem, a network interface card, or other well-known interface device, such as those used for coupling to Ethernet, token ring, or other types of networks.

In the foregoing specification, the invention has been described with reference to specific embodiments. It will, however, be evident that various modifications and changes can be made without departing from the broader spirit and scope of the invention as set forth in the appended claims. The specification and drawings are, accordingly, to be regarded in an illustrative rather than a restrictive sense.

What is claimed is:

1. A method, comprising:
   a decoder for decoding, on a pixel-by-pixel basis, audio/video data using a table of encoded pixel parameter values, wherein each pixel is represented by an entry in the table, the entry includes a dominant pixel color component, and the table further comprises redundant entries, wherein each one of the redundant entries is decoded by recalling previously decoded pixel parameter values associated with each one of the redundant entries;
   a processor for scaling a set of segment reference pixels comprised of segment reference pixel values according to each entry in the table of encoded pixel parameter values to produce decoded pixels comprised of decoded pixel parameter values; and
   a display unit for displaying the decoded pixels.

2. The method of claim 1, wherein each set of the segment reference pixels corresponds to an encoded segment of a frame.

3. The method of claim 2, wherein the set of the segment reference pixel values comprises a unique set of color pixels for each encoded segment, wherein each segment reference pixel represents a pixel with a most intense dominant pixel color component for each encoded segment.

4. The method of claim 3, wherein the set of segment reference pixels comprises a representative red pixel, green pixel, blue pixel, and black pixel.

5. The method of claim 1, wherein the table of encoded pixel parameter values further comprises at least one of luminance, chrominance, and color depth.

6. The method of claim 1, wherein the set of the segment reference pixel values further comprises a dominant color pixel value, non-dominant pixel color values, and luminance and chrominance values.

7. The method of claim 6, wherein scaling the set of segment reference pixel values comprises scaling the segment reference pixel's dominant color pixel value, non-dominant pixel color values, and luminance and chrominance values.

8. The method of claim 1, wherein the table of encoded pixel parameter values further comprises non-dominant pixel color components.

9. The method of claim 8, wherein the set of segment reference pixels are comprised of full-scale pixel parameter values.

10. The method of claim 9, wherein scaling the set of segment reference pixel values further comprises scaling each of the full-scale pixel parameter values with the each corresponding encoded pixel parameter values.

11. The method of claim 1, further comprising synchronizing audio data associated with the decoded table of encoded pixel parameter values.

12. The method of claim 1, wherein prior to decoding the audio/video data, receiving a file including the table of encoded pixel parameter values and the set of segment reference pixel values.

13. The method of claim 12, wherein the file further comprises a header comprised of video frame information and audio information.

14. The method of claim 13, further comprising processing the file by using the header to determine data locations within the file, including the beginning and end of the table of encoded pixel parameter values and the corresponding segment reference pixel values.

15. The method of claim 1, wherein after scaling the set of segment reference pixel values according to each entry in the table of encoded pixel parameter values, communicating the decoded pixels to a playback device.

16. The method of claim 15, further comprising communicating and synchronizing audio data to the playback device.

17. The method of claim 15, wherein prior to communicating decoded pixel parameter values to the playback device, converting the decoded pixel parameter values to another display format.

18. A decoder to generate, pixel by pixel and segment by segment, a frame of audio/video data based upon a table of encoded pixel parameter values, wherein each pixel is represented by a single color entry in the table, and to scale a representative set of segment reference pixel values according to the table, wherein a segment is a fractional portion of the frame of audio/video data, and wherein the table further comprises redundant entries, wherein each one of the redundant entries in decoded by recalling previously decoded pixel parameter values associated with each one of the redundant entries.

19. A computer readable medium storing a set of instructions that, when executed by a computer, cause the computer to execute a method, the method comprising;
- decoding, on a pixel-by-pixel basis, audio/video data using a table of encoded pixel parameter values, wherein each pixel is represented by an entry in the table, the entry includes a dominant pixel color component, and the table further comprises redundant entries, wherein each one of the redundant entries is decoded by recalling previously decoded pixel parameter values associated with each one of the redundant entries; and
- scaling a set of segment reference pixels comprised of segment reference pixel values according to each entry in the table of encoded pixel parameter values to produce decoded pixels comprised of decoded pixel parameter values.

* * * * *